United States Patent [19]
Yamaguchi

[11] Patent Number: 5,775,614
[45] Date of Patent: Jul. 7, 1998

[54] FISHING REEL WITH SPOOL SUPPORTED BETWEEN TWO SIDE PLATES, LEVEL WIND DEVICE AND MEANS FOR LINKING SPOOL DRIVE CLUTCH WITH LEVEL WIND DEVICE

[75] Inventor: Nobuyuki Yamaguchi, Tokyo, Japan

[73] Assignee: Daiwa Seiko, Inc., Tokyo, Japan

[21] Appl. No.: 803,883

[22] Filed: Feb. 21, 1997

[30] Foreign Application Priority Data

Feb. 21, 1996 [JP] Japan .................. 8-058431

[51] Int. Cl.⁶ .................................. A01K 89/015
[52] U.S. Cl. ............................ 242/261; 242/279
[58] Field of Search .................. 242/278, 279, 242/280, 281, 261

[56] References Cited

U.S. PATENT DOCUMENTS

| | | | |
|---|---|---|---|
| 615,526 | 12/1898 | Brosnaham, Jr. | 242/279 |
| 1,001,857 | 8/1911 | Jernstedt | 242/278 |
| 2,639,870 | 5/1953 | Graham | 242/280 |
| 3,612,425 | 10/1971 | Shakespeare | 242/279 |
| 4,223,854 | 9/1980 | Karlsson | 242/280 |
| 5,348,246 | 9/1994 | Kim | 242/279 |

FOREIGN PATENT DOCUMENTS

62-38537  10/1987  Japan .
2-29914   8/1990   Japan .

Primary Examiner—Katherine Matecki
Attorney, Agent, or Firm—Sughrue, Mion, Zinn, Macpeak & Seas, PLLC

[57] ABSTRACT

A fishing reel of a double bearing type which, when a spool is free, can switch the linked condition of the spool with a fishing line guide part over to the non-linked condition thereof, thereby being able to reduce the rotation resistance of the spool, enhance the spool-free rotation performance of the reel, extend the fishing line carry of the reel, and improve the fishing line play-out performance of the reel. Within an outer side plate, there is a drive device for driving a spool and a clutch mechanism for switching the condition of the spool and, within an outer side plate, there is a level wind drive switching device for switching the condition of a level wind device. The level wind drive switching device includes an engaging portion which is made up of an engaging portion formed in a spool shaft and an engaging portion formed in a drive gear. A gear, which is mounted on a traverse cam shaft provided in the level wind device, can be rotated by the drive gear, a pinion in mesh with the drive gear, and a gear wheel in mesh with the pinion and the gear. The level wind drive switching device can be switched by a clutch operation member.

9 Claims, 11 Drawing Sheets

FISHING REEL WITH SPOOL SUPPORTED BETWEEN TWO SIDE PLATES, LEVEL WIND DEVICE AND MEANS FOR LINKING SPOOL DRIVE CLUTCH WITH LEVEL WIND DEVICE

BACKGROUND OF THE INVENTION

The present invention relates to a double bearing type fishing reel which is capable of switching connection and disconnection between the rotation of a spool and the reciprocation of a fishing line guide portion of a level wind device.

Conventionally, as disclosed in Japanese Utility Model Publication Nos. 62-38537 of Showa and 2-29914 of Heisei, there has been generally known a double bearing type fishing reel including a level wind device which is used to wind a fishing line in parallel around a spool rotatably supported between the two side plates of a reel main body. Level wind devices can be classified into a stationary type level wind devices which, as disclosed in the former publication, are prevented against reciprocation while the spool is free, and movable type level wind devices which, as disclosed in the latter publication, are allowed to reciprocate in linking with the spool while the spool is free.

When compared with the former or stationary type level wind device, the latter or movable type level wind device can be easily assembled and taken apart without damaging the drive gear, and the drive portion thereof can be divided into right and left sections, so that it can keep its balance well. It is also advantageous in that the drive portion thereof is not concentrated in one of the two side plates of the reel main body. However, since the movable type level wind device operates in linking with the spool while the spool is free, the rotation resistance thereof becomes large, which lowers the spool-free rotation performance thereof to thereby make it unable to extend the carry of the fishing line, resulting in the poor play-out performance of the fishing line.

That is, due to the fact that the level wind device of a movable type operates in linking with the spool in the spool-free condition, the rotation resistance thereof becomes large, which degrades the spool-free rotation performance of the reel to thereby be unable to extend the fishing line carry of the reel, resulting in the fishing line poor play-out performance of the reel.

SUMMARY OF THE INVENTION

The present invention aims at eliminating the drawbacks found in the above-mentioned conventional fishing reel of a double bearing type. Accordingly, it is an object of the invention to provide a fishing reel of a double bearing type which, when the spool is set in the spool-free condition, switches the connection of the fishing line guide part of the level wind device with the spool into a spool-non-linked condition to reduce the rotation resistance of the spool, thereby being able to enhance the spool free rotation performance of the reel, extend the fishing line carry of the reel, and improve the fishing line play-out performance of the reel.

In attaining the above object, according to the invention, there is provided a fishing reel of a double bearing type including a level wind device for winding a fishing line in parallel around a spool rotatably supported between the two side plates of a reel main body and allowing a fishing line guide part of the level wind device to be reciprocated right and left in linking with the rotation of the spool, characterized by level wind drive switching-means capable of switching the fishing line guide part between a spool-linked condition, in which the fishing line guide part can be driven in linking with the rotation of the spool, and a spool-non-linked condition in which the fishing line guide part is not driven in linking with the rotation of the spool.

Also, according to the invention, there is provided level wind drive switching means which, in linking with a clutch mechanism for switching the spool between a spool free condition and a fishing line take-up condition, is able to switch the fishing line guide part over to the spool-non-linked condition when the spool is set in the spool free condition and also to switch the fishing line guide part over to the spool-linked condition when the spool is set in said fishing line take-up condition.

When a spool is set in the spool free condition, if a level wind device D can be switched by level wind drive switching means E over to the spool-non-linked condition in which the level wind device D is not linked with the rotation of the spool 13, then the rotation resistance of the spool 13 can be reduced. This can enhance the spool free rotation performance of the reel, can extend the fishing line carry of the reel, can enhance the casting performance of the reel, and can improve the fishing line play-out performance of the reel.

If two right and left operation members 8 and 8' can be secured integrally by a cover member 68, and also if a clutch mechanism C and the level wind drive switching means E can be switched at the same time by a single operation member 8'', then a fishing line guide part 9 can be quickly switched over to the spool-non-linked condition when the spool is set in the spool free condition, or to the spool-linked condition when the spool is set in the fishing line take-up condition, in linking with the clutch mechanism C which is capable of switching the spool 13 between the spool free condition and the fishing line take-up condition. Also, the operation of the present fishing reel can be simplified as well as the efficiency of the operation thereof can be improved.

DETAILED DESCRIPTION OF THE PREFERRED EMBODIMENTS

Now, description will be given below of the present invention with reference to the embodiments thereof respectively shown in the accompanying drawings.

In these figures, a reel main body A includes a side frame 1, inner side plates 2, 3, and outer side plates 2', 3', while the inner and outer side plates are respectively disposed outside the side frame 1.

The side frame 1 includes two right and left side frames 1a, 1b, an upper support member 1c, and a fixing plate 1d to which a reel leg 10 can be fixed, while these components are formed integrally with one another and the two right and left side frames 1a and 1b are held in parallel to each other.

The inner side plate 2 and outer side plate 2' are combined together by a screw (not shown) and are also mounted on the outside of the left frame 1a by a screw rod (not shown), whereas the inner side plate 3 and outer side plate 3' are combined together by a screw (not shown) and are also mounted on the outside of the right side frame 1b by a screw rod (not shown).

The inner plates 2 and 3 respectively include cylindrical portions 2a and 3a formed on the inner sides thereof, bearings 11 and 12 are mounted within the cylindrical portions 2a and 3a respectively, and a spool shaft 4 is supported by the bearings 11 and 12.

A spool 13 is fixed to the spool shaft 4, while the spool 13 is also interposed between the two right and left side frames 1a and 1b.

Within the outer side plate 2', there are provided drive means B for driving the spool 13 and a clutch mechanism C for switching the condition of the spool 13.

The drive means B includes a pinion 5 which is fitted with the small diameter portion 4a of the spool shaft 4 in such a manner that it can be freely moved in the axial direction thereof, a drive gear 14 in mesh with the pinion 5, and a handle shaft with which the drive gear 14 is fitted.

The spool 13 can be rotated by means of the drive means B and a handle 15 mounted on the handle shaft 6, while a fishing line 16 can be wound around the fishing line winding barrel portion of the spool 13.

The clutch mechanism C includes an engaging portion which is made up of an engaging portion 4b formed in the spool shaft 4 and an engaging portion 5a formed in the pinion 5.

In the pinion 5, there is formed a peripheral groove 5b with which is fitted an arc-shaped recess formed in the central portion of a clutch plate 17.

The two end portions of the crutch plate 17 are respectively fitted with support members 18 and 18 which are fixed to the inner side plate 2, while the clutch plate 17 is energized by a spring (not shown) in a direction in which the engaging portion 4b of the spool shaft 4 is engaged with the engaging portion 5a of the pinion 5.

Inside the inner side plate 2, there is formed a recessed portion 2b on the outside of the cylindrical portion 2a, while a spool cover 19 is fitted into and fixed to the recessed portion 2b.

The spool cover 19 is inserted into a through hole 1e formed in the left side frame 1a and is also projected out toward the spool 13.

The inner side plate 2 includes a cylindrical portion 2c on the left outside thereof, while a cylindrical clutch operation member 7 is rotatably fitted with the outer periphery of the cylindrical portion 2c and is prevented against removal by an engaging pin 20.

The outer side plate 2' includes a through hole 2d extending therethrough, a recessed portion 2e formed in the inside thereof, and a shaft cylindrical portion 2f provided on and projected from the outside thereof, while there are formed male threads on the outer periphery of the shaft cylindrical portion 2f.

A bearing 21 is fitted into and mounted in the recessed portion 2e, while the end portion of the small diameter portion of the spool shaft 4 is journaled on the bearing 21.

An adjust knob 22 for pressure contact of the end portion of the spool shaft 4 is threadedly engaged with the above-mentioned male threads, a thrust bearing 23 is fixed to the inside bottom surface of the adjusting knob 22, and the end portion of the small diameter portion of the spool shaft 4 is in contact with the thrust bearing 23.

On the left outside of the inner side plate 2, there is formed a recessed portion 2g into which a bearing 24 is fitted, while one end portion 6a of the handle shaft 6 is rotatably fitted with the bearing 24 and is also prevented against removal by a removal preventive plate 25.

In the outer side plate 2', there are formed a through hole 2h and a recessed portion 2i.

A bearing 26 is fitted into and mounted in the recessed portion 2i.

The bearing 26 journals the handle shaft 6 through a collar 27 which is fitted with the handle shaft 6 in such a manner that it is freely movable in the axial direction thereof but is prevented against rotation.

In the handle shaft 6, there are provided the above-mentioned one end portion 6a and a flange portion 6b, a reversal preventive ratchet wheel 28 and a drive gear 14 are superimposedly pressure fitted with the flange portion 6b while a friction plate 29 is interposed between the ratchet wheel 28 and drive gear 14, and the reversal preventive ratchet wheel 28 is fitted with the handle shaft 6 in such a manner that it is prevented against rotation.

A plurality of kick projections 30 are fixed to the outer periphery of the reversal preventive ratchet wheel 28.

The drive gear 14 includes in the central portion thereof a storage portion which is made up of a round hole and a recessed portion. And, a brake plate 31, a friction plate 32, a brake plate 33, a brake plate 31, a friction plate 32, and a brake plate 33 respectively forming a drag mechanism are inserted into and stored in the storage portion of the drive gear 14 in this order.

Also, on the inner periphery of the storage portion, there are provided a pair of projections which extend in the axial direction of the drive gear 14, while the brake plates 31 are fitted with the pair of projections in a rotation preventive manner and are also rotatably fitted with the outer periphery of the handle shaft 6.

The brake plates 33 are fitted with the outer periphery of the handle shaft 6 in a rotation preventive manner and rotatably fitted with the drive gear 14.

A pressing disc 34, which is fitted with the handle shaft 6 in a rotation preventive manner, is in contact with the brake plate 33 disposed on the opening side of the drive gear 14.

Springs 35 and 36, which are respectively fitted with the handle shaft 6 in a rotation preventive manner, are in contact with the right side of the pressing disc 34.

The above-mentioned collar 27 is located adjacent to and in contact with the spring 36.

A nut 37, which is in threaded engagement with the threaded portion 6c of the handle shaft 6, is disposed adjacent to and in contact with the collar 27.

The above-mentioned handle 15 is fitted in a rotation preventive manner with the portion of the handle shaft 6 that is located outside of the nut 37, while the handle 15 is also prevented against removal by a cap nut 38.

The nut 37 is fitted into a polygonal through hole formed in a drag adjust knob 39 in such a manner that the nut 37 is freely movable back and forth in the axial direction thereof.

In the side portion of the outer side plate 2' located outside of the bearing 26 journaling the handle shaft 6 thereon, there is formed a recessed portion 2j. And, between the recessed portion 2j and the drag adjust knob 39, there is rotatably interposed an intermediate member 40 which is formed of a hard synthetic resin member or hard felt. Also, between the drag adjust knob 39 and handle 15, there is interposed another intermediate member 41 which is formed of an O ring.

The reversal preventive ratchet wheel 28 is fitted with the handle 6 in a rotation preventive manner. And, on the outside of the reversal preventive ratchet wheel 28, a reversal preventive pawl 43 held by and between two spring plates 42 and 42 is rotatably journaled on a shaft 44, the two spring plates 42 and 42 hold the two side surfaces of the reversal preventive ratchet wheel 28 between them, and the leading end of the reversal preventive pawl 43 is so located as to be freely engageable with securing teeth which are formed on the outer periphery of the reversal preventive ratchet wheel 28.

Now, the clutch operation member 7 is made up of an annular portion 7a, a clutch lever 7b, a pair of clutch cams 7c respectively provided on the end face of the annular portion 7a, a clutch switching pin 45 planted on the end face of the annular portion 7a, and a spring placement portion 7d provided on the outer periphery of the annular portion 7a.

The annular portion 7a of the clutch operation member 7 is rotatably fitted with the outer periphery of the cylindrical portion 2c of the inner side plate 2. The annular portion 7a of the clutch operation member 7 is prevented against removal by the above-mentioned engaging pin 20 fixed to the cylindrical portion 2c and by an elongated hole 7e formed in the annular portion 7a and extending in the peripheral direction of the annular portion 7a.

The clutch operation member 7 can be energized between a clutch-on condition and a clutch-off condition by a dead point spring 46 which is placed on the spring placement portion 7d and the inner side plate 2.

On the inner side plate 2, there are erected pins 47 and 48 which are respectively used to restrict the rotation range of the clutch lever 7b.

The clutch lever 7b includes an operation member 8 which is formed integrally with the clutch lever 7b or which is formed separately from the clutch lever 7b and is united with the clutch lever 7b by a screw 49.

The operation member 8 is inserted into a through hole 2k formed in the inner side plate 2 and a through hole 1f formed in the left side frame 1a, and is projected inwardly of the left side frame 1a.

A kick lever 51 is rotatably journaled on a shaft which is fixed to the inner side plate 2.

One end 51a of the kick lever 51 is situated in the rotation area of the kick projection 30 of the reversal preventive ratchet wheel 28, whereas the other end 51b is situated in such a manner that it can be contacted with the clutch switching pin 45 provided on the end face of the annular portion 7a.

Now the above-mentioned clutch mechanism C is made up of the engaging portion 4b of the spool shaft 4, the engaging portion 5a of the pinion 5, the clutch plate 17, the clutch lever 7b and clutch cams 7c of the clutch operation member 7, the operation member 8, and the kick lever 51.

The inner side plate 3 includes on the inside thereof a recessed portion 3b which is formed on the outside of the cylindrical portion 3a of the inner side plate 3, while a spool cover 52 is fitted into and fixed to the recessed portion 3b.

The spool cover 52 is inserted into a through hole 1g formed in the right side frame 1b and is projected toward the spool 13.

The inner side plate 3 includes a cylindrical portion 3c formed on the right outside thereof, while a cylindrical clutch operation member 7' is rotatably fitted with the outer periphery of the cylindrical portion 3c and is prevented against removal by an engaging pin 20.

Now, between the two right and left side frames 1a and 1b and in front of the spool 13, there is provided a level wind device D.

The level wind device D is made up of a guide cylinder 53, a traverse cam shaft 56 journaled on bearings 54 and 55 which are disposed within the guide cylinder 53, and a fishing line guide part 9 which is slidable right and left along the outer periphery of the guide cylinder 53.

One end of the guide cylinder 53 is inserted into and fitted with a through hole 1h formed in the left side frame 1a, whereas the other end of the guide cylinder 53 is inserted into and fitted with a through hole 1i formed in the right side frame 1b and a through hole 3d formed in the inner side plate 3 and is further projected into the outer side plate 3'.

On the other hand, one end of the traverse cam shaft 56 is fitted and contacted with the bearing 54, whereas the other end thereof is fitted with the bearing 55 and the small diameter portion of the other end is fitted and contacted with a bearing 57 which is fitted with a recessed portion 3e formed in the outer side plate 3'.

The fishing line guide part 9 includes a main body 9a to be fitted with the outer periphery of the guide cylinder 53, a through hole 9b which is opened up in the main body 9a and into which the guide cylinder 53 is fitted, a projecting portion 9c provided on the main body 9a and projected backwardly therefrom, a threaded portion 9e which is formed on the outer periphery of the projecting portion 9d and with which a cap 59 can be threadedly engaged, a fishing line guide portion 9f provided on the main body 9a and projected upwardly therefrom, and a projecting portion 9g provided on the main body 9a and projected downwardly therefrom.

A hard fishing line guide member 60 is fixed to a through hole formed in the fishing line guide portion 9f.

A guide rod 61 is fitted into a through hole 9h formed in the projecting portion 9g which is projected downwardly from the main body 9a.

An engaging member 58 is in engagement with a traverse groove formed in the traverse cam shaft 56.

Within the outer side plate 3', there is provided level wind drive switching means E which is used to switch the condition of the level wind device D.

Part of the level wind drive switching means E is identical in shape with the clutch mechanism C and is thus given the same designation.

In particular, an engaging portion 4c, which is provided in the portion of the spool shaft 4 that is situated on the counter-handle side, and an engaging portion 5c provided in the drive gear 5' cooperate in forming the engaging portion of the level wind drive switching means E.

The level wind drive switching means E includes the drive gear 5' which is fitted with the small diameter portion 4d of the spool shaft 4 in such a manner that it is freely movable in the axial direction thereof, a pinion 62 in mesh with the drive gear 5', a gear wheel 63 in mesh with the pinion 62, a gear 64 mounted on the traverse cam shaft 56 of the level wind device D, the engaging portion 4c of the spool shaft 4, the engaging portion 5c of the drive gear 5', a clutch plate 17, and a cylindrical clutch operation member 7', while the traverse cam shaft 56 can be rotated by means of the rotation of the spool shaft 4.

The pinion 62 is journaled on a shaft 65 one end of which is fixed to the inner side plate 3, while the gear wheel 63 is journaled on a shaft 66 one end of which is fixed to the outer side plate 3'.

The small diameter portion 4d of the spool shaft 4 is in contact with a thrust bearing 67 which is fixed to the inside of the outer side plate 3'.

The drive gear 5' includes a peripheral groove 5b with which is fitted an arc-shaped recess formed in the central portion of the clutch plate 17.

The two ends of the clutch plate 17 are respectively fitted with two support members 18 and 18 which are fixed to the inner side plate 3, and the clutch plate 17 is energized by a spring (not shown) in a direction where the engaging portion 4c of the spool shaft 4 is engaged with the engaging portion 5c of the drive gear 5'.

Now, the clutch operation member 7' is made up of an annular portion 7a, a clutch lever 7b, a pair of clutch cams 7c formed on the end face of the annular portion 7a, and a spring placement portion 7d formed on the outer periphery of the annular portion 7a.

The annular portion 7a of the clutch operation member 7' is rotatably fitted with the outer periphery of the cylindrical portion 3c of the inner side plate 3.

The annular portion 7a of the clutch operation member 7' is prevented against removal by the above-mentioned engaging pin 20 fixed to the cylindrical portion 3c and by an elongated hole 7e formed in the annular portion 7a and extending in the peripheral direction thereof.

The clutch operation member 7' is energized between a clutch-on condition and a clutch-off condition by a dead point spring 46 which is provided around the spring placement portion 7d and the inner side plate 2.

On the inner side plate 3, there are planted two pins 47 and 48 which are used to restrict the rotation range of the clutch lever 7b.

The clutch lever 7b includes an operation member 8' which is formed integrally with the clutch lever 7b or is formed separately from the clutch lever 7b and is then united with the clutch lever 7b by a screw 49.

The operation member 8' is inserted into a through hole 1j formed in the right side frame 1b and a through hole 3f formed in the inner side plate 3 and is projected inwardly of the right side frame 1b.

The level wind drive switching means E includes the engaging portion 4c of the spool shaft 4, the engaging portion 5c of the drive gear 5', the clutch plate 17, the clutch lever 7b and clutch cams 7c of the clutch operation body 7', and the operation member 8'.

Referring now to the operation of the present fishing reel of a double bearing type, in a fishing line take-up condition in which the clutch mechanism C on the handle side and the level wind device D on the counter-handle side are respectively held in their clutch-on conditions in FIGS. 4 to 7, if the handle 15 is rotated, then the spool 13 is rotated through the drive gear 14, pinion 5 and spool shaft 4 so that a fishing line 16 can be wound around the spool 13.

At this time, the rotation of the spool 13 rotates the traverse cam shaft 56 and the fishing line guide part 9 is reciprocated along the guide cylinder 53 in linking with the rotation of the spool 13.

If the fishing line guide part 9 is reciprocated, then the fishing line 16 is wound in parallel around the spool 13.

If the fishing line 16 is pulled out by the tug of fish in the fishing line take-up condition, then the reversal preventive pawl 43 is secured to the reversal preventive ratchet wheel 28 and the spool 13 is played out against the brake force of the drag mechanism within the drive gear 14, with the brake force set by the drag adjust knob 39.

Figure 9:
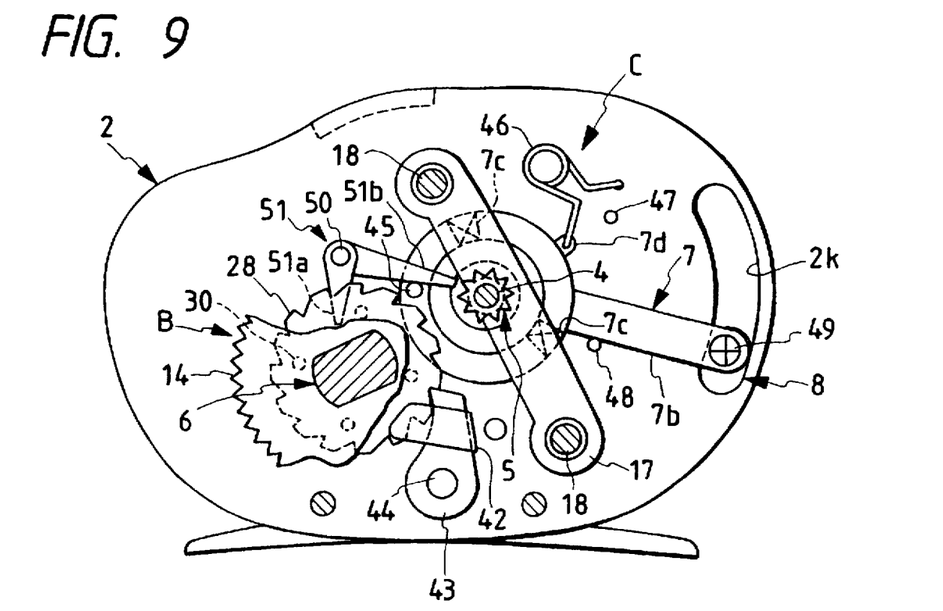
FIG. 9 is a sectional side view of the main portions of the clutch mechanism provided within the side plate on the handle side of the first embodiment, showing its clutch-off condition.
Figure 11:
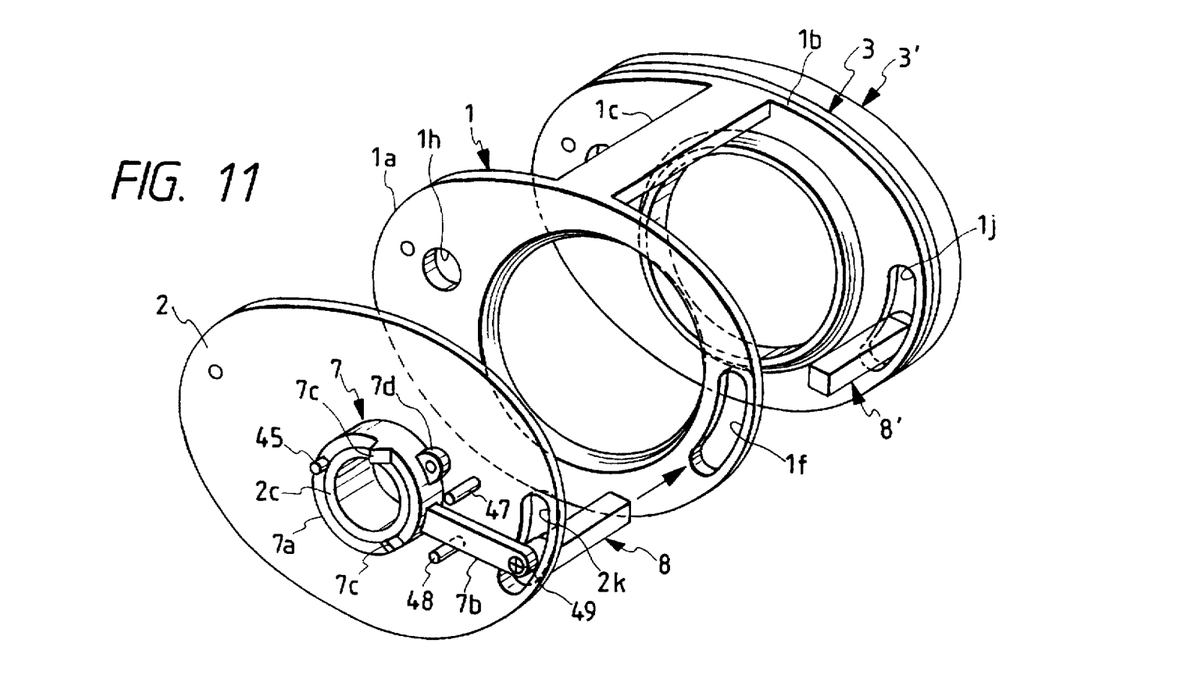
FIG. 11 is an exploded perspective view of the clutch mechanism provided within the side plate on the handle side of the first embodiment, showing its clutch-off condition.

If the operation member 8 is pressed down and the operation member 8 and the clutch lever 7b of the clutch operation member 7 are thereby rotated downward as shown in FIGS. 9 and 11, then the pair of clutch cams 7c push up the clutch plate 17 in the axial direction thereof to thereby remove the engagement between the engaging portion 4b of the spool shaft 4 and the engaging portion 5a of the pinion 5 included in the handle-side clutch mechanism C, with the result that the clutch mechanism C is turned into its clutch-off or spool-free condition.

At this time, the level wind drive switching means E of the counter-handle-side level wind device D is in its clutch-on or fishing line take-up condition and, therefore, the traverse cam shaft 56 is rotated in linking with the reverse rotation of the spool 13 and the fishing line guide part 9 is thereby caused to reciprocate along the guide cylinder 53.

Figure 10:
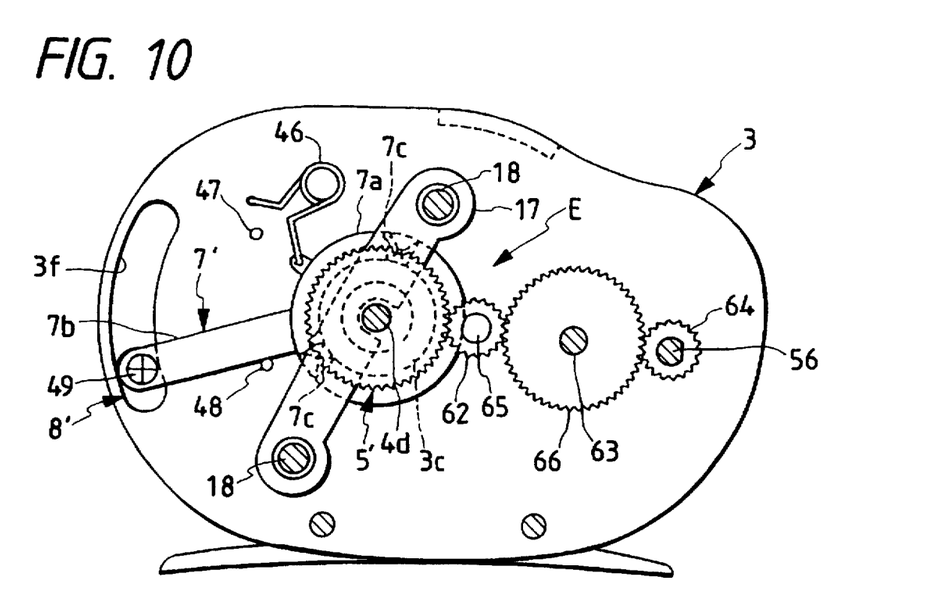
FIG. 10 is a sectional side view of the main portions of the level wind drive switching means provided within the side plate on the counter-handle side of the first embodiment, showing its clutch-off condition.
Figure 12:
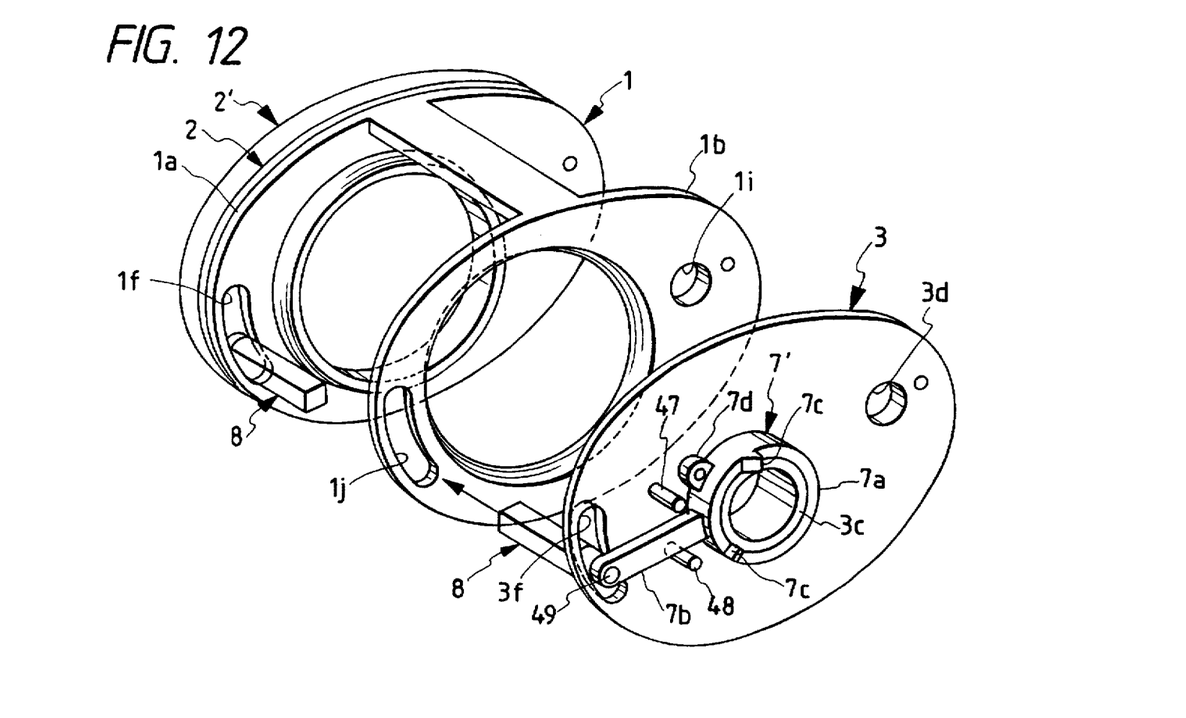
FIG. 12 is an exploded perspective view of the level wind drive switching means provided within the side plate on the counter-handle side of the first embodiment, showing its clutch-off condition.

Next, while the operation member 8 remains pressed down, if the operation member 8' is pressed down and the operation member 8' and the clutch lever 7b of the clutch operation member 7' are thereby rotated downward as shown in FIGS. 10 and 12, then the pair of clutch cams 7c push up the clutch plate 17 in the axial direction thereof to thereby remove the engagement between the engaging portion 4c of the spool shaft 4 and the engaging portion 5c of the drive gear 5' in the level wind drive switching means E of the counter-handle-side level wind device D, so that the level wind drive switching means E is turned into its clutch-off condition in which the level wind drive switching means E is free from or not linked with the rotation of the spool 13.

At this time, since the traverse cam shaft 56 is free from the rotation of the spool 13, the reciprocating motion of the fishing line guide part 9 is caused to stop.

Figure 1:
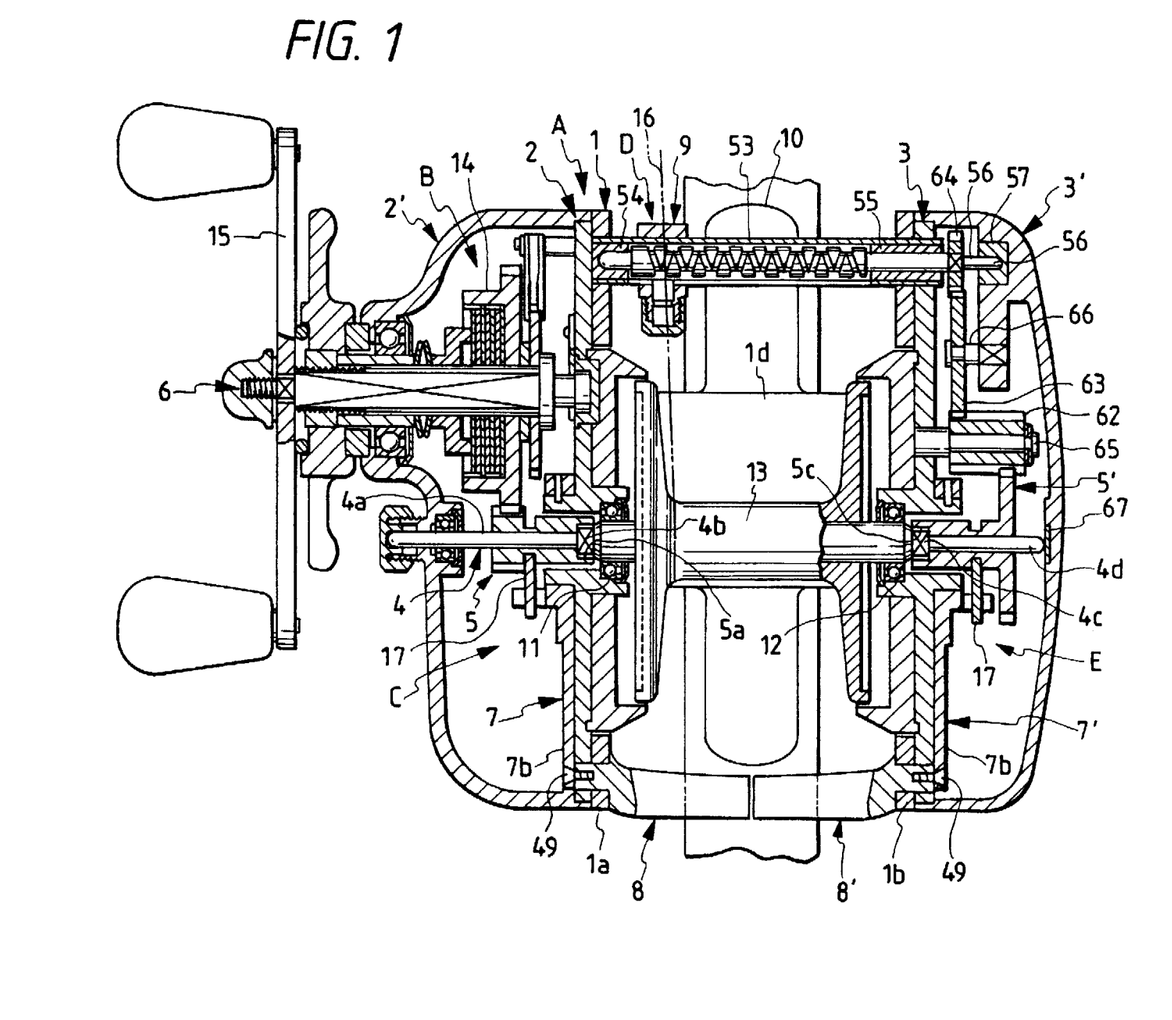
FIG. 1 is a sectional plan view of a first embodiment of a fishing reel of a double bearing type according to the invention.
Figure 2:
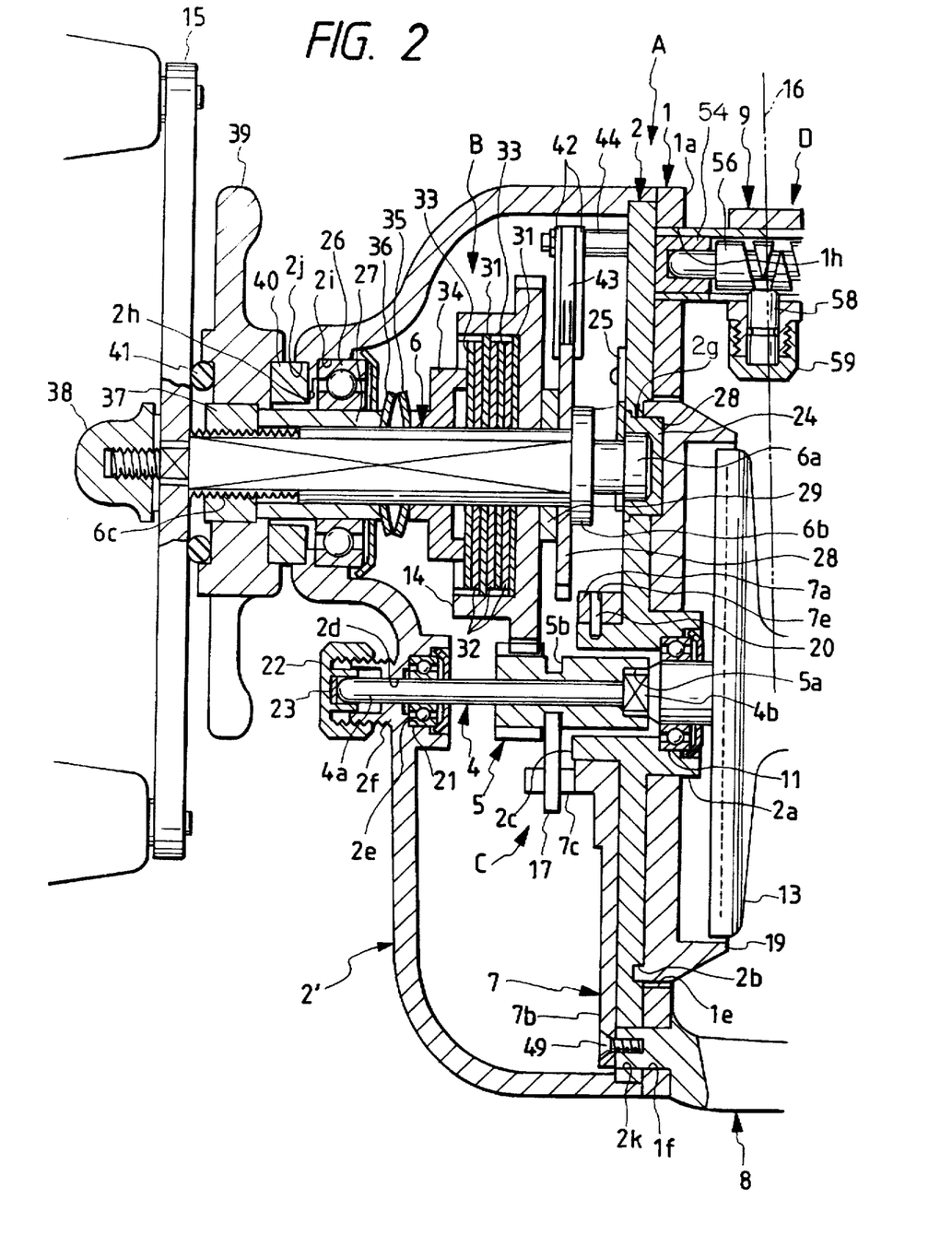
FIG. 2 is an enlarged sectional plan view of the handle side of the first embodiment.
Figure 3:
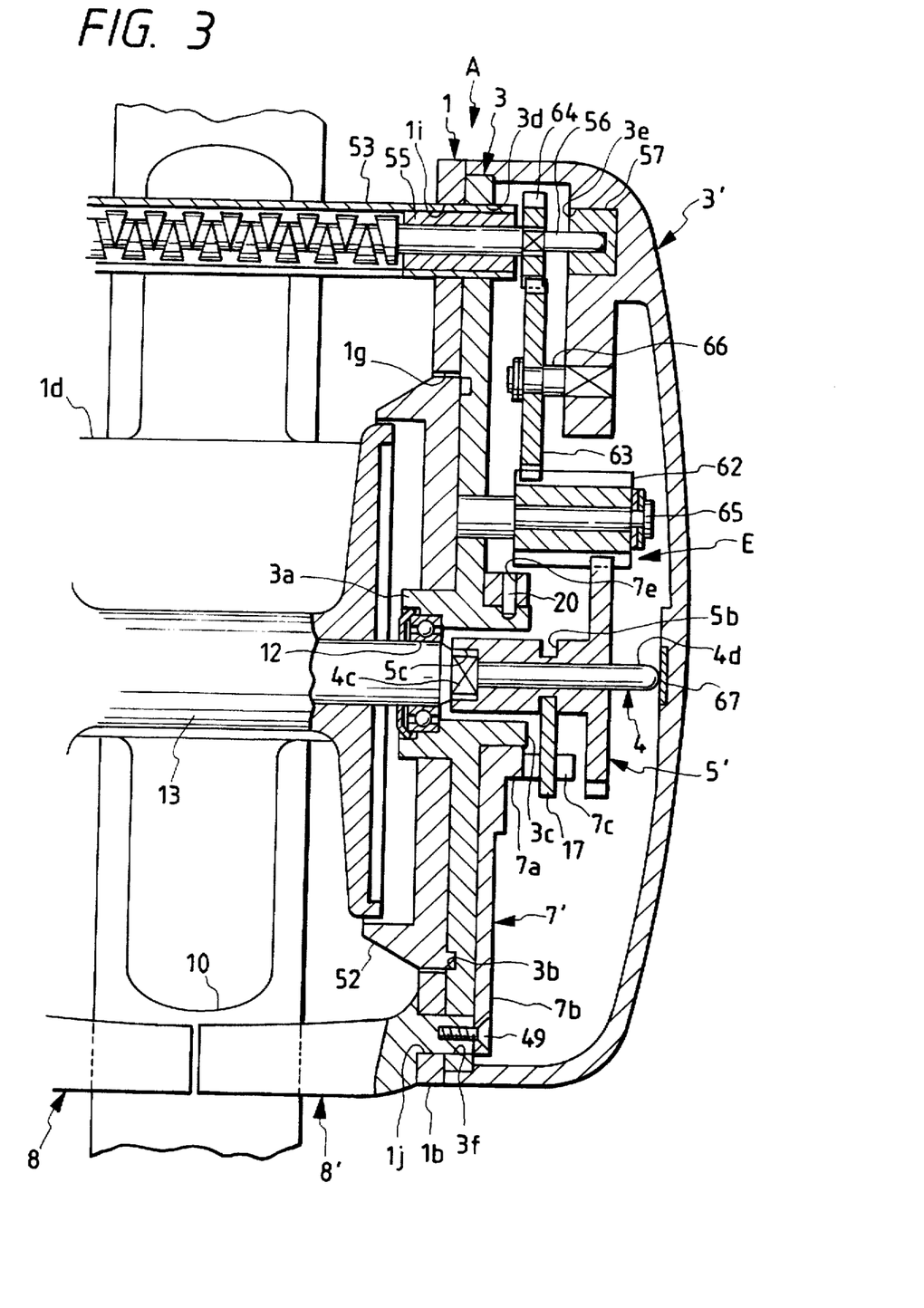
FIG. 3 is an enlarged sectional plan view of the counter-handle side of the first embodiment.
Figure 4:
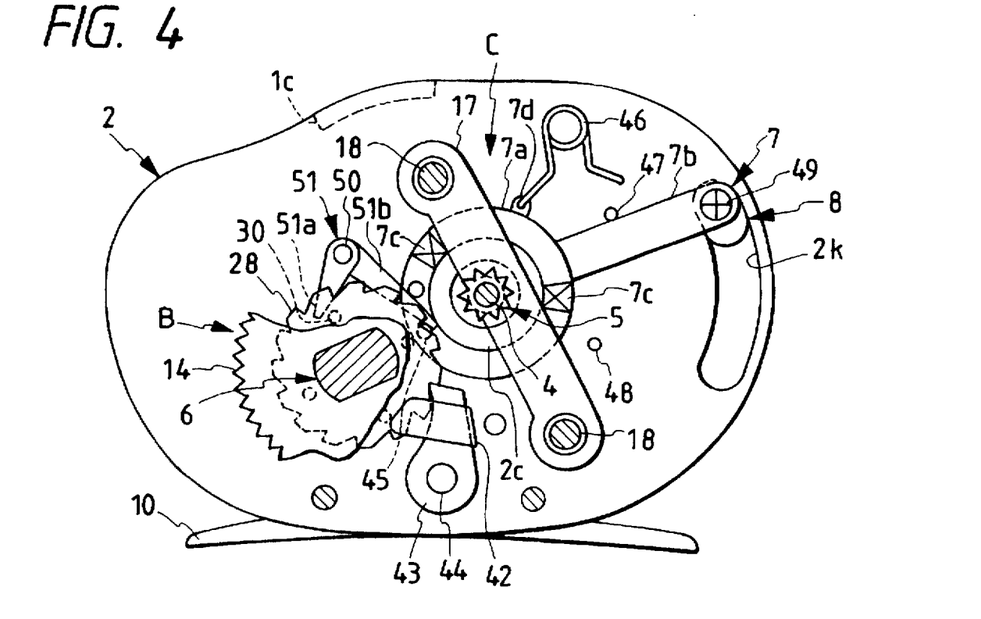
FIG. 4 is a sectional side view of the main portions of a clutch mechanism provided within a side plate on the handle side of the first embodiment, showing its clutch-on condition.

Next, with the operation member 8 remaining pressed down, if the handle 15 is rotated, then the reversal preventive ratchet wheel 28 is rotated and is thereby returned from the condition shown in FIG. 9 to the condition shown in FIG. 4, and the kick projection 30 is brought into contact with one end 51a of the kick lever 51, so that the kick lever 51 is rotated counterclockwise in FIG. 9.

The counterclockwise rotation of the kick lever 51 brings the other end 51b of the kick lever 51 into contact with a clutch switching pin 45 planted on the end face of the annular portion 7a of the clutch operation member 7, so that the present annular portion 7a is rotated.

The rotation of the annular portion 7a of the clutch operation member 7 removes the pair of clutch cams 7c out of the position of the clutch plate 17. As a result of this, the pinion 5 is moved to thereby bring the engaging portion 4a of the spool shaft 4 into engagement with the engaging portion 5a of the pinion 5, which turns the level wind drive switching means E into the clutch-on condition, so that the spool 13 can be rotated by rotating the handle 15.

Figure 5:
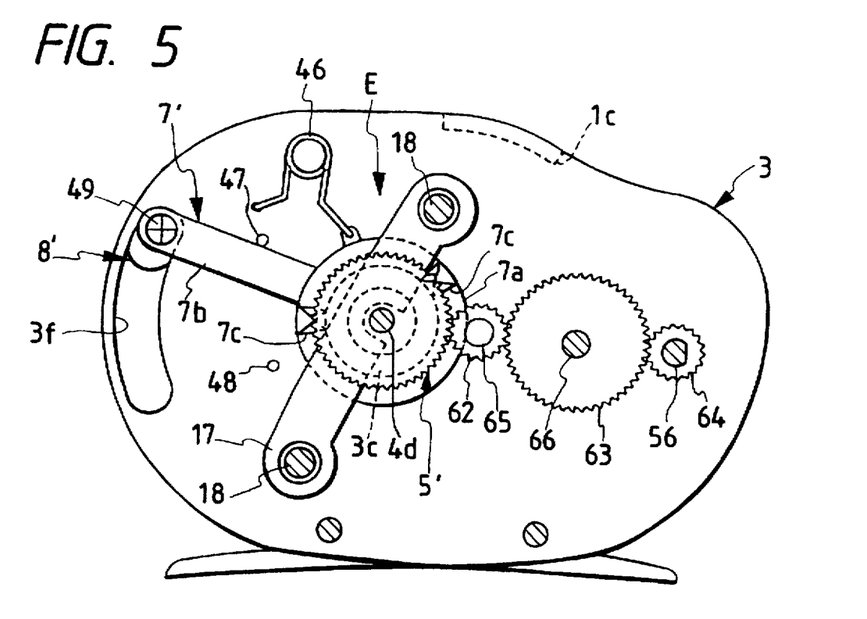
FIG. 5 is a sectional side view of the main portions of level wind drive switching means provided within a side plate on the counter-handle side of the first embodiment, showing its clutch-on condition.
Figure 6:
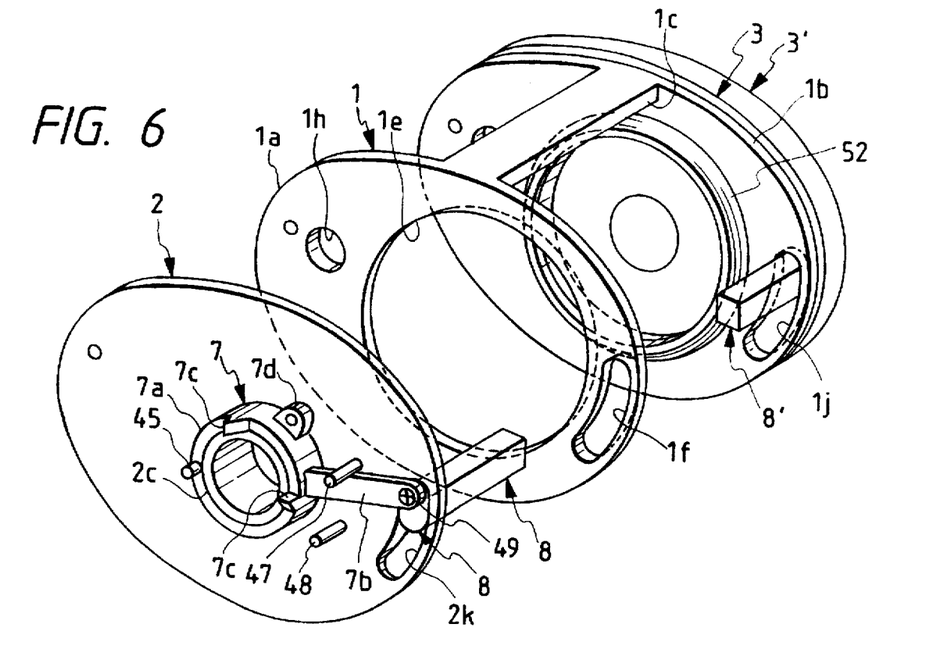
FIG. 6 is an exploded perspective view of the clutch mechanism provided within the side plate on the handle side of the first embodiment, showing its clutch-on condition.
Figure 7:
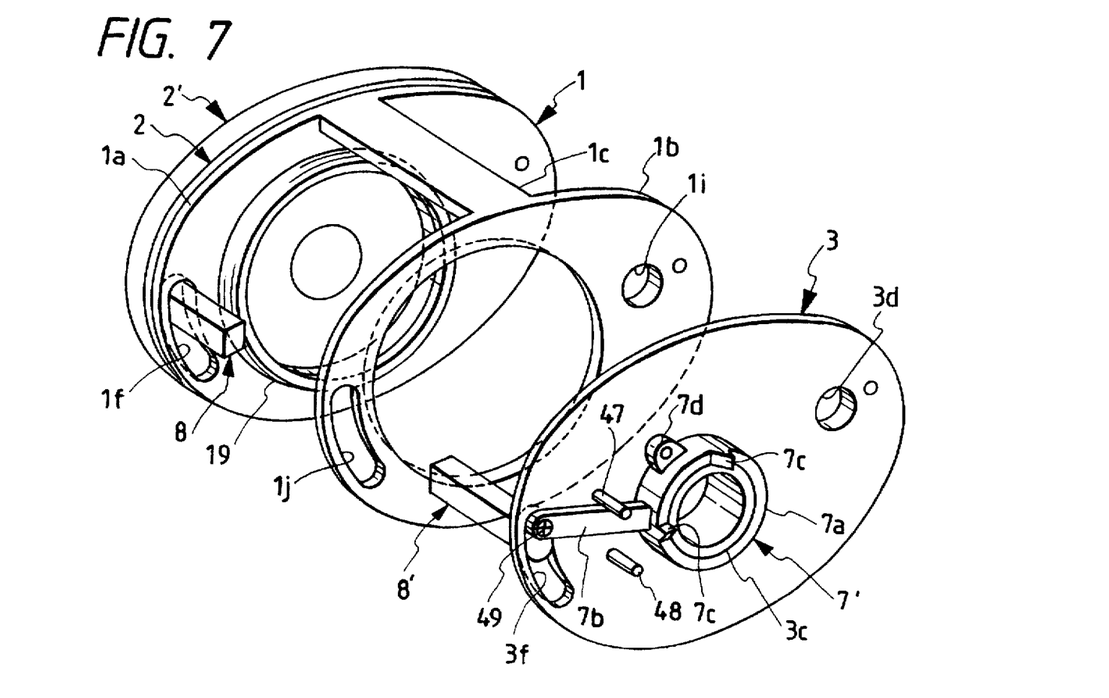
FIG. 7 is an exploded perspective view of the level wind drive switching means provided within the side plate on the counter-handle side of the first embodiment, showing its clutch-on condition.
Figure 8:
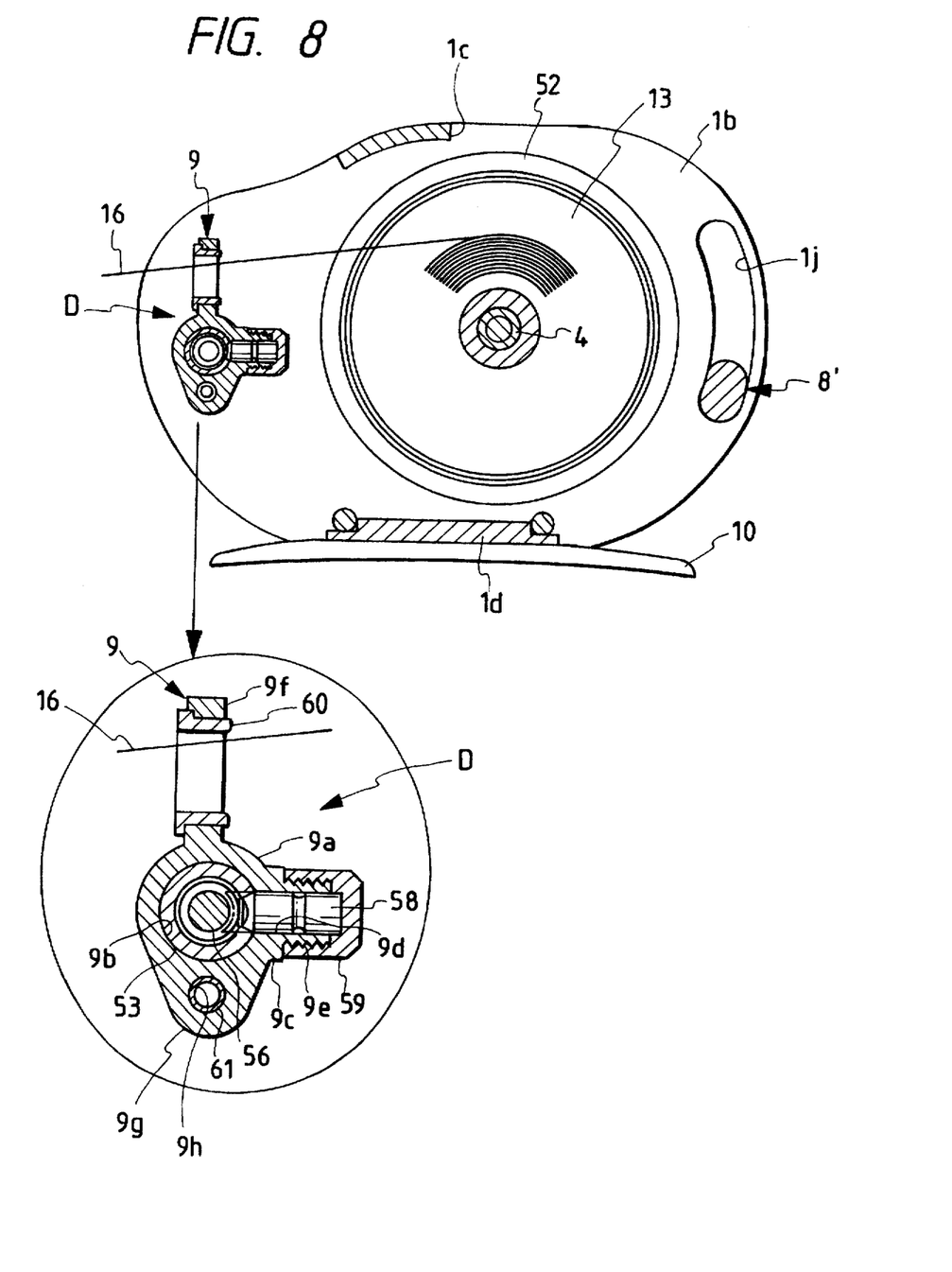
FIG. 8 is a sectional side view of the interior portions of the side frame when viewed from the handle side of the first embodiment, and an enlarged sectional side view of a fishing line guide part employed in the first embodiment.

When the level wind drive switching means E is returned to the clutch-on condition, the clutch lever 7b of the clutch operation member 7' is lifted up by the operation member 8', that is, it is rotated upward from the position shown in FIGS. 10 and 12 to the position shown in FIGS. 5 and 7.

The upward rotation of the clutch lever 7b removes the pair of clutch cams 7c out of the clutch plate 17 position. Due to this, the engaging portion 4c of the spool shaft 4 is engaged with the engaging portion 5c of the drive gear 5' to thereby turn the level wind drive switching means E into the clutch-on condition, so that the level wind device D can be operated in linking with the rotation of the spool 13.

As described above, if the level wind device D can be set free from the rotation of the spool 13 in the spool-free condition by switching the level wind drive switching means E, then the rotation resistance of the spool 13 can be reduced, which makes it possible to enhance the spool-free rotation performance of the reel, to extend the fishing line carry of the reel, to enhance the casting performance of the reel and to improve the fishing line play-out performance of the reel.

For example, in a short casting operation to play out and take up the fishing line by several meters, the casting operation can be carried out while the fishing line guide part 9 is held stationary at the central position thereof, which permits the reel to deal with a wide range of operations in actual fishing.

In other words, when the fishing reel of a double bearing type is structured in the above-mentioned manner, then the rotation resistance of the spool 13 can be reduced, which makes it possible to enhance the spool-free rotation performance of the reel, to extend the fishing line carry of the reel, to enhance the casting performance of the reel and to improve the fishing line play-out performance of the reel. Besides, since the drive means B for driving the spool 13, the clutch mechanism C for switching the condition of the spool 13, and the level wind drive switching means E are distributively arranged, with the spool 13 as the boundary thereof, the weight balance of the reel is improved to thereby be able to improve the fishing line winding performance of the reel.

Figure 13:
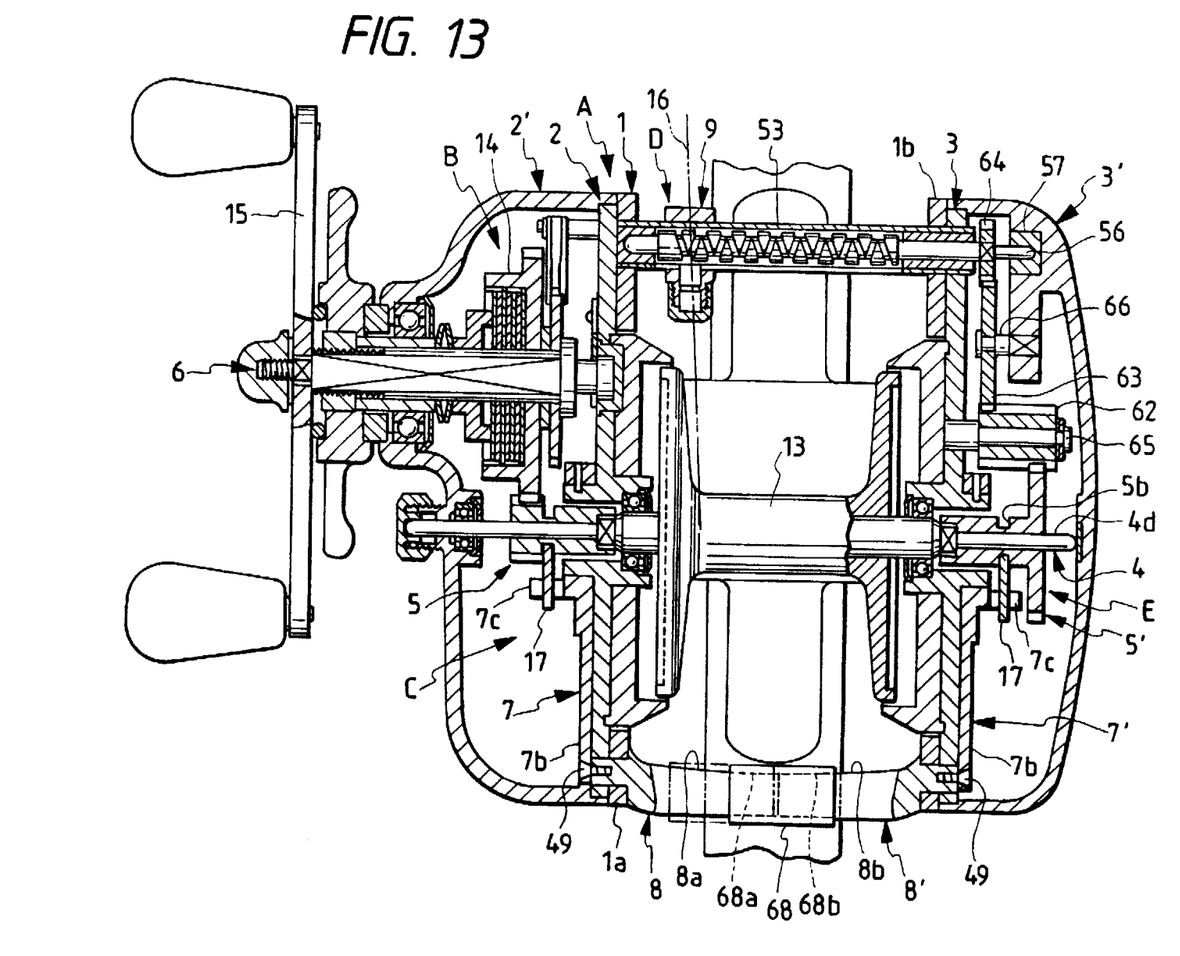
FIG. 13 shows an applied embodiment of an operation member employed in the invention and FIG. 13 is a sectional plan view of a fishing reel of a double bearing type.

Now, FIG. 13 shows an applied embodiment of the operation member and FIG. 13 is also a sectional plan view of a fishing reel of a double bearing type.

In the applied embodiment of the operation member, a freely slidable cover member 68 is fitted with the outer peripheries of two right and left operation members 8 and 8'.

The left operation member 8 includes an outer surface which is a plane 8a linear in the horizontal direction thereof, whereas the outer surface of the right operation member 8' is formed such that it includes a slanting surface 8b in at least part thereof in the horizontal direction thereof.

The inner shape of the cover member 68 is made up of a plane portion 68a matched in shape to the outer surface of the operation member 8 and a slanting surface 68b matched in shape to the outer surface of the operation member 8'.

The cover member 68 can also be secured by a screw or the like between the slidable and non-slidable conditions.

The remaining portions of the structure of the applied embodiment are substantially the same as the previously described first embodiment.

While the two right and left operation members 8 and 8' are secured integrally by the cover member 68, if the operation member 8 is pressed down, then the operation member 8' is also pressed down at the same time. Therefore, when the clutch mechanism C is switched from the clutch-off condition to the clutch-on condition due to the rotation of the handle 15, the level wind drive means E is also switched over to the clutch-on condition at the same time.

As in the above-mentioned applied embodiment, if the two right and left operation members 8 and 8' can be secured integrally by the cover member 68 and the clutch mechanism C and level wind drive switching means E can be switched at the same time, then the fishing line guide part 9 can be switched quickly to the non-spool-linked condition when the clutch mechanism C is held in the spool free condition, or to the spool-linked condition when the clutch mechanism C is set in the fishing line take-up condition, in linking with the clutch mechanism C which is used to switch the spool 13 between the spool free condition and fishing line take-up condition. Also, with use of the present structure, the operation of the operation member can be simplified as well as the efficiency of the operation of the operation member can be improved.

Figure 14:
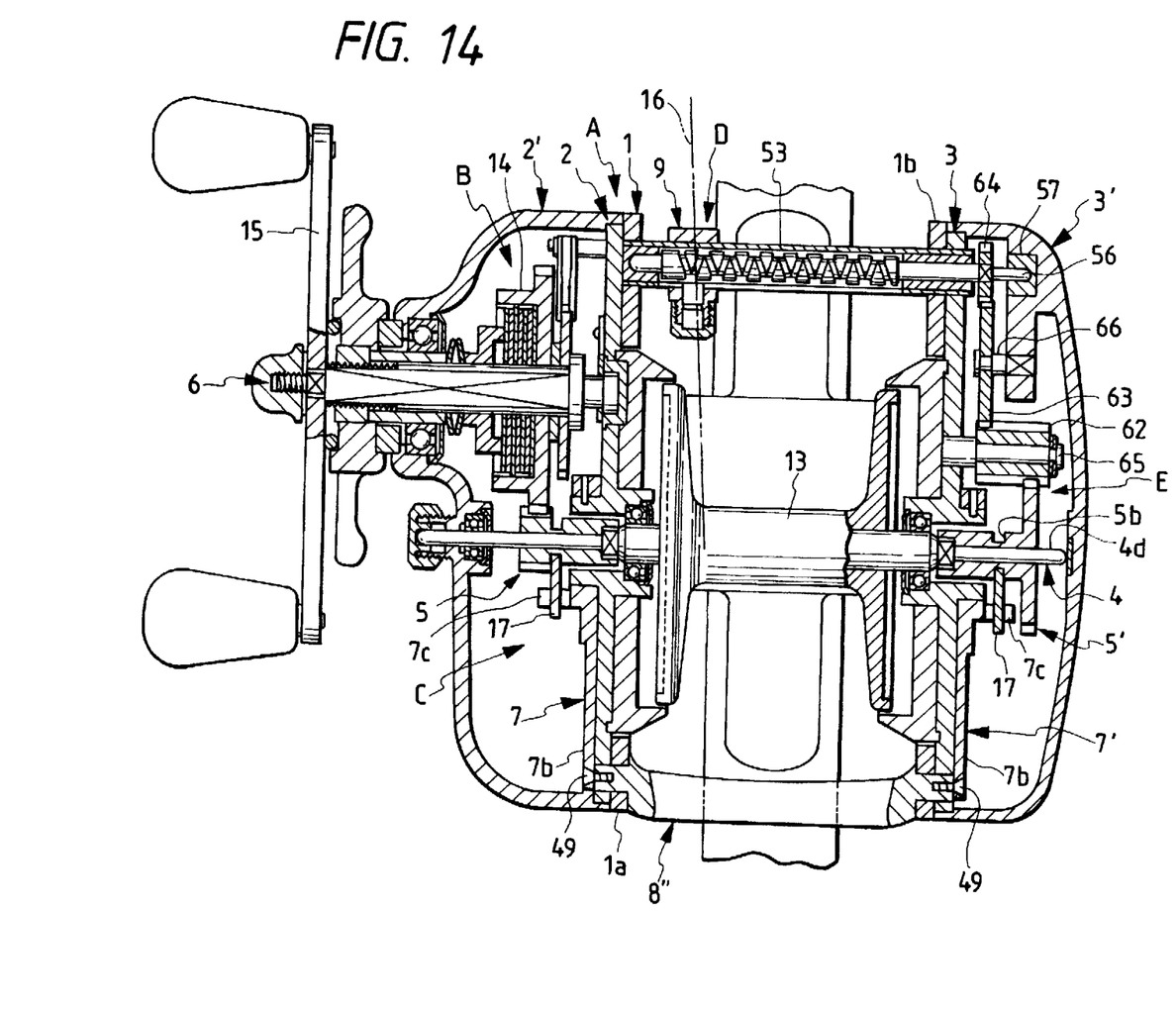
FIG. 14 shows a first modification of the above operation member and FIG. 14 is a sectional plan view of a fishing reel of a double bearing type.

Now, FIG. 14 shows a first modification of the operation member and FIG. 14 is also a sectional plan view of a fishing reel of a double bearing type.

In the first modification of the operation member, the two ends of an operation member 8" are mounted on the clutch levers 7b of the clutch operation members 7 and 7' by screws 49 respectively.

The remaining portions of the structure of the first modification are substantially the same as the previously described first embodiment.

Figure 15:
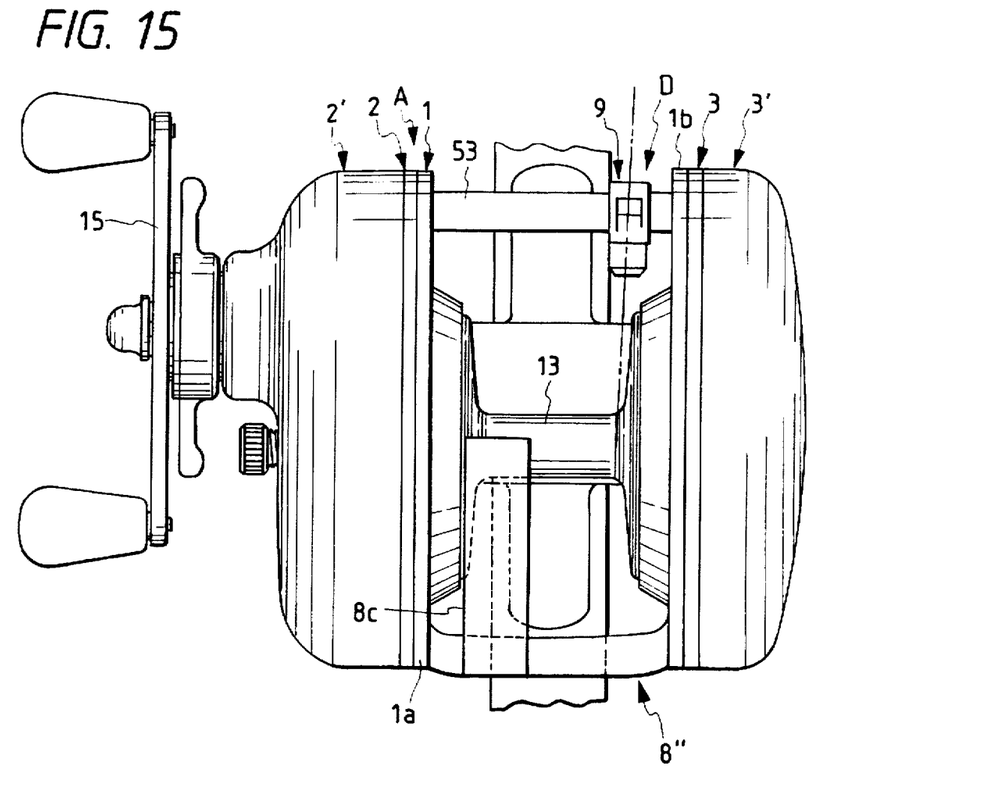
FIG. 15 shows a second modification of the above operation member and FIG. 15 is a sectional plan view of a fishing reel of a double bearing type; and, FIG. 16 is a partially broken sectional side view of the main portions of the clutch mechanism provided within the side plate on the handle side of the fishing reel using the second modification of the operation member, showing the clutch-off condition of the clutch mechanism.
Figure 16:
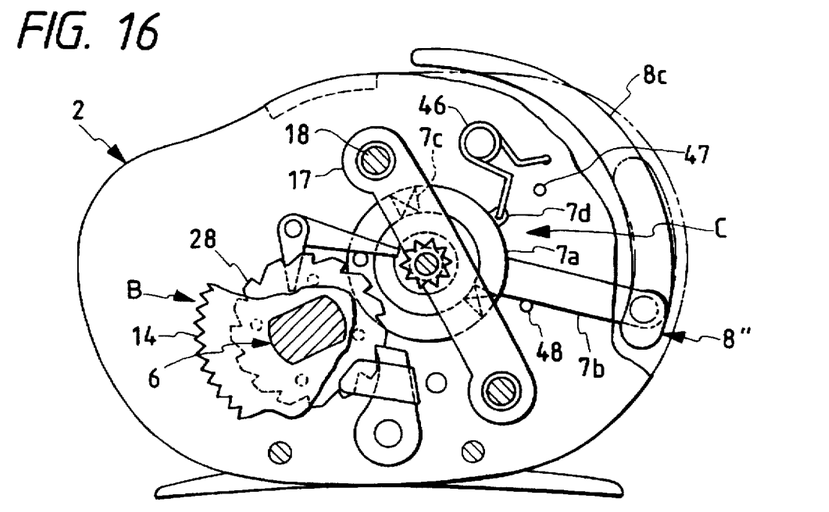

Now, FIGS. 15 and 16 respectively show a second modification of the operation member. In particular, FIG. 15 is a sectional plan view of a fishing reel of a double bearing type, while FIG. 16 is a partly broken sectional side view of the main portions of a clutch mechanism provided within a side plate disposed on the handle side, showing the clutch-off condition thereof.

In the second modification of the operation member, the operation member 8" includes an arm portion 8c which is extended forwardly and upwardly from one side of the operation member 8".

The remaining portions of the structure of the second modification are substantially the same as the above-mentioned first modification.

In a state in which the operation member 8" is pressed down and the operation member 8" and the clutch levers 7b of the clutch operation members 7 and 7' are rotated downward, if the leading end side of the arm portion 8c of the operation member 8" is rotated and is thereby pressed down, then the clutch levers 7b of the clutch operation members 7 and 7' are respectively rotated upward, that is, they are moved upward.

The above-mentioned arm portion 8c may also be provided on the two ends of the operation member 8".

Also, the arm portion 8c may further be provided in the right and left operation members 8 and 8' of the first embodiment.

In the above description, the annular portions 7a of the clutch operation members 7 and 7' are fitted with the outer peripheries of the cylindrical portions which are formed in the inner side plates but, according to the invention, there may also be formed cylindrical portions in the side frames, and the annular portions 7a of the clutch operation members 7 and 7' may be fitted with the outer peripheries of the cylindrical portions of the side frames respectively.

Also, in the above description, each of the clutch operation members 7 and 7' is formed of an annular portion 7a, a clutch lever 7b, a pair of clutch cams 7c respectively provided on the end face of the annular portion 7a, a clutch switching pin 45 planted on the end face of the annular portion 7a, and a spring placement portion 7d provided on the outer periphery of the annular portion 7a. However, this is not limitative but, according to the invention, it is also possible to employ a clutch operation member which is structured in a different manner.

Further, in the above description, the present invention has been described when it is applied to the left handle reel. However, even when the invention is applied to a right handle reel, there can also be obtained a similar operation effect.

Still further, in the above description, the side frame 1 of the reel main body A is structured such that the two right and left side frames 1a, 1b, the upper support member 1c, and the fixing plate 1d for fixing the reel leg portions 10 thereto are formed integrally with one another, and also that the two right and left side frames 1a and 1b are held in parallel to each other. However, according to the invention, the components of the side frame 1 may also be formed separately from one another and the two right and left side frames may be held in parallel to each other.

Yet further, in the above description, the present fishing reel of a double bearing type is assumed to be a reel in which the spool 13 can be rotated by rotating the handle 15. However, the present invention may also be applied to an electric reel.

The present invention is structured in the above-mentioned manner. Therefore, since the rotation resistance of the spool can be reduced, the spool-free rotation performance of the reel can be enhanced, the fishing line carry of the reel can be extended, the casting performance of the reel can be enhanced, and the fishing line play-out performance of the reel can be improved.

Also, since the clutch mechanism and the level wind drive switching means on the spool drive means side are structured in such a manner that they can be switched integrally, in linking with the switching operation of the clutch mechanism which can switch the spool from the spool-free condition to the fishing line take-up condition and vice versa, the fishing line guide part can be quickly switched over to the spool-non-linked condition when the clutch mechanism is set in the spool free condition, and the fishing line guide part can be quickly switched over to the spool-linked condition when the clutch mechanism is set in the fishing line take-up condition. Also, the operation of the reel can be simplified and the efficiency of the operation of the reel can be improved. That is, according to the invention, it is possible to provide a fishing reel of a double bearing type which can provide the above-mentioned excellent effects.

What is claimed is:

1. A fishing reel comprising:

a reel main body including two side plates;

a spool rotatable supported between said two side plates;

means for rotating said spool;

a level wind device supported by said reel main body for winding a fishing line around the spool when the spool is rotated by said means for rotating, said level wind device including a fishing line guide part;

level wind drive switching means for switching the fishing line guide part between a spool-linked condition in which the fishing line guide part is driven to reciprocate right and left in linking with rotation of the spool, and a spool-non-linked condition wherein the fishing line guide part is kept stationary regardless of the rotation of the spool;

a clutch mechanism for switching said spool between a spool free condition in which the spool is not driven by the means for rotating and a fishing line take-up condition in which the spool is driven by the means for rotating; and means for linking the level wind drive switching means with the clutch mechanism so that the level wind drive switching means switch the fishing line guide part over to the spool-non-linked condition when the spool is set in the spool free condition and switch the fishing line guide part over to the spool-linked condition when the spool is set in the fishing line take-up condition.

2. A fishing reel comprising:

a reel main body including two side plates;

a spool rotatably supported between said two side plates;

means for rotating said spool;

a level wind device supported by said reel main body for winding a fishing line around the spool when the spool is rotated by said means for rotating, said level wind device including a fishing line guide part that moves reciprocally along a length of said spool;

a first gear assembly and a first clutch assembly connected between said means for rotating and said spool;

a second gear assembly and a second clutch assembly connected between said spool and said level wind device;

a first operation member for manually operating said first clutch assembly; and a second operation member for manually operating said second clutch assembly.

3. A fishing reel as recited in claim 2, wherein said first operation member and said second operation member are disposed in a rear portion of said reel main body.

4. A fishing reel as recited in claim 2, wherein said first operation member and said second operation member are separate members.

5. A fishing reel as recited in claim 4, further comprising a cover member slidably fitted with outer peripheries of said first operation member and said second operation member.

6. A fishing reel as recited in claim 2, wherein said first operation member and said second operation member are integral with each other.

7. A fishing reel as recited in claim 2, wherein said first clutch assembly comprises a first clutch lever and said second clutch assembly comprises a second clutch lever.

8. A fishing reel as recited in claim 7, wherein said first operation member and said second operation member are connected to said first clutch lever and said second clutch lever, respectively, by screws.

9. A fishing reel as recited in claim 2, further comprising an arm portion protruding from at least one of said first operation member and said second operation member for manipulating said at least one of said first operation member and said second operation member.

* * * * *